United States Patent
Bjernulf

[11] Patent Number: 5,870,035
[45] Date of Patent: Feb. 9, 1999

[54] INSTRUMENT PANEL

[75] Inventor: Olle Bjernulf, Upsala, Sweden

[73] Assignee: Pharmacia Biotech AB, Upsala, Sweden

[21] Appl. No.: 849,340

[22] PCT Filed: Dec. 8, 1995

[86] PCT No.: PCT/SE95/01483

§ 371 Date: Jun. 6, 1997

§ 102(e) Date: Jun. 6, 1997

[87] PCT Pub. No.: WO96/18226

PCT Pub. Date: Jun. 13, 1996

[30] Foreign Application Priority Data

Dec. 8, 1994 [SE] Sweden ................................ 9404276

[51] Int. Cl.$^6$ .................................................. H03K 17/94
[52] U.S. Cl. ............................ 341/35; 341/23; 341/192; 364/188; 345/184; 455/170.1
[58] Field of Search .............. 455/154.1, 154.2, 455/158.2, 170.1; 345/134, 184; 364/188; 341/35, 192, 23, 173, 176; 340/825.24, 825.25

[56] References Cited

U.S. PATENT DOCUMENTS

| | | | |
|---|---|---|---|
| 4,898,578 | 2/1990 | Rubalcaba, Jr. | 364/188 |
| 5,366,346 | 11/1994 | Danby | 341/35 |
| 5,572,239 | 11/1996 | Jaeger | 345/184 |
| 5,774,115 | 6/1998 | Jaeger et al. | 341/23 |
| 5,777,603 | 7/1998 | Jaeger | 341/23 |
| 5,786,811 | 7/1998 | Jaeger | 345/184 |

FOREIGN PATENT DOCUMENTS

| | | |
|---|---|---|
| 0188162 A3 | 7/1986 | European Pat. Off. . |
| 0347686 A1 | 12/1989 | European Pat. Off. . |
| 0504514 A1 | 9/1992 | European Pat. Off. . |
| 2648845 A | 2/1978 | Germany ................... 345/184 |

*Primary Examiner*—Brian Zimmerman
*Assistant Examiner*—Timothy Edwards, Jr.

[57] ABSTRACT

An instrument panel for co-operation with a microprocessor storing selectable functions and selectable numerical information, comprises a knob (2'), a first switch (3'), an alphanumerical indicator (1'), and a second switch (4'). The knob (2') is rotatable to, in a first operating mode of the microprocessor, select a desired function and, in a second operating mode, selected the desired numerical information. By means of the first switch (3'), the selected function is accepted, the microprocessor is transferred to the second operating mode, the selected numerical information is accepted, and the microprocessor is returned to the first operating mode. The alphanumerical indicator (1') displays both the selected functions and the alphanurnerical information. By means of the second switch (4'), a selection is discarded and the microprocessor is returned to the first operating mode.

3 Claims, 1 Drawing Sheet

INSTRUMENT PANEL

TECHNICAL FIELD

The invention relates to an instrument panel for co-operation with a microprocessor in which a predetermined number of selectable functions are stored together with selectable numerical information, comprising a knob which is rotatable through a predetermined number of discrete positions in order to, in a first operating mode of the microprocessor, select, among said selectable functions, a desired function and, in a second operating mode of the microprocessor, select the desired numerical information to be supplied to the microprocessor, and a first switch by means of which, in said first operating mode, the function selected by means of the knob is accepted and the microprocessor is transferred to said second operating mode, and by means of which, in this second operating mode, the numerical information selected by means of the knob is accepted and the microprocessor is returned to the first operating mode.

BACKGROUND OF THE INVENTION

Today, instruments within the field of chemistry/biotechnology field exhibit mainly three different types of instrument panels, namely either a number of keys and knobs but no indicator, or a digital indicator and a number of keys and, possibly, knobs, or an alphanumerical indicator and a number of keys and, possibly, knobs. It is to be understood that the respective key is intended for switching/operating a corresponding switch.

The keys are either general in the form of a numerical keyboard or dedicated to a certain function. By means of the knobs, different values are set and, normally, the knobs have fixed setting ranges, i.e. can be rotated from a minimum value to a maximum value.

Today, all different instruments have their own panel.

Therefore, each time a user starts using a new instrument, he/she has to learn the instrument panel which is unique for the instrument in question. If several instruments are interconnected into a system, this will be quite complicated to handle since the different instruments in the system exhibit different panels. Therefore, such systems have to be characterized as user-unfriendly.

From an ergonomic point of view, it is also disadvantageous with keyboards on normal instrument panels since it is difficult to press the keys on vertical keyboards.

With unique panels for all different instruments, problems also arise in connection with the development of new instruments since the development time will be longer each time a new panel has to be designed and tested. Moreover, it is more expensive to produce instruments with different panels.

As examples of prior art instrument panels, reference is made to EP-A2-0 188 162 (video tape recorder system), EP-A1-0 347 686 (entertainment electronics), and EP-A1-0 504 514 (multimeter).

BRIEF DESCRIPTION OF THE INVENTION

The object of the invention is to bring about a user-friendly user-interface in the form of a general standardized instrument panel.

This is attained by means of an instrument panel for co-operation with a microprocessor in which a predetermined number of selectable functions are stored together with selectable numerical information, and comprising a knob which is rotatable through a predetermined number of discrete positions in order to, in a first operating mode of the microprocessor, select, among said selectable functions, a desired function and, in a second operating mode of the microprocessor, select the desired numerical information to be supplied to the microprocessor, and a first switch by means of which, in said first operating mode, the function selected by means of the knob is accepted and the microprocessor is transferred to said second operating mode, and by means of which, in this second operating mode, the numerical information selected by means of the knob is accepted and the microprocessor is returned to the first operating mode, mainly, in that the instrument panel according to the invention comprises an alphanumerical indicator for displaying the functions selected by means of the knob as well as the alphanumerical information selected by means of the knob, and a second switch by means of which the selection made by means of the knob is discarded and the microprocessor is returned to the first operating mode.

Preferably, the knob is rotatable any number of revolutions in both directions through a predetermined number of discrete positions per revolution.

BRIEF DESCRIPTION OF THE DRAWING

The invention will be described more in detail below with reference to the appended drawing on which

DESCRIPTION OF PREFERRED EMBODIMENTS

Figure 1:
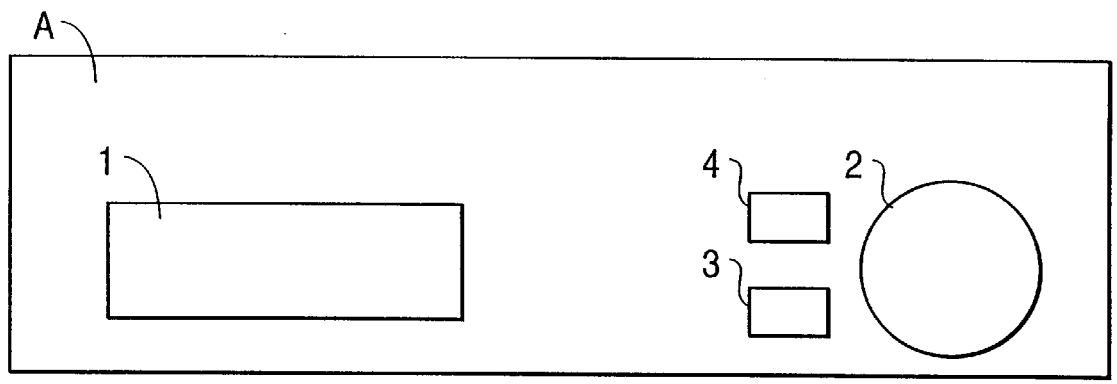
FIG. 1 shows a first embodiment of an instrument panel according to the invention.

FIG. 1 shows a first embodiment of an instrument panel according to the invention, which panel e.g. can be intended for an instrument included in a chromatography system.

The instrument panel A shown in FIG. 1 comprises an alphanumerical indicator 1, a knob 2 and two keys 3 and 4 for switching/operating one switch (not shown) each.

The indicator 1 is adapted to display alphanumerical information emanating from a microprocessor (not shown) with which the instrument panel according to the invention is adapted to co-operate and in which a predetermined number of selectable functions are stored together with selectable numerical information.

The alphanumerical indicator 1 can e.g. be a liquid crystal display (LCD) module.

According to the invention, the knob 2 is rotatable any number of revolutions in both directions (clockwise and counter-clockwise) through a predetermined number of discrete positions, e.g. 24 discrete positions per revolution. By means of the knob 2, in a first operating mode of the microprocessor, a desired function is selected to be displayed on the indicator 1 among said selectable functions stored in the microprocessor. As examples of selectable functions in connection e.g. with chromatography instruments, "set wavelength" and "set flow rate" can be mentioned.

By means of the key 3 which can be provided with the text "OK", in said first operating mode of the microprocessor, the function selected by means of the knob 2 is accepted, whereupon a transfer automatically takes place to a second operating mode of the microprocessor, in which second operating mode the desired numerical information to be supplied to the microprocessor and to be displayed on the indicator 1, is selected by means of the knob 2.

Thus, if the function "set wavelength" was selected in the first operating mode, the digit value for the desired wavelength is, thus, set in the second operating mode by means of the knob 2. In a corresponding manner, the digit value of a desired flow rate is set by means of the knob 2 in case the function "set flow rate" was selected in the first operating mode by means of the knob 2.

The selection of the desired numerical information in the second operating mode of the processor, is accepted by means of the key 3, then, a transfer to the first operating mode automatically takes place.

By means of the key 4 which can be provided with the text "CANCEL", the selection made by means of the knob 2, is discarded and a transfer to the first operating mode takes place automatically.

In case a very large number of functions are selectable by means of the knob 2, in the first operating mode, a predetermined number of subfunctions can be subordinated one or more of the functions in the first operating mode. These subfunctions appear in an intermediate operating mode of the microprocessor, which is accepted by means of the key 3, and in which mode the desired subfunction is selected by means of the knob 2, and a selected subfunction is accepted by means of the knob 3 for transfer to the second operating mode in order to select the desired numerical information to be supplied to the microprocessor and displayed on the indicator 1.

Figure 2:
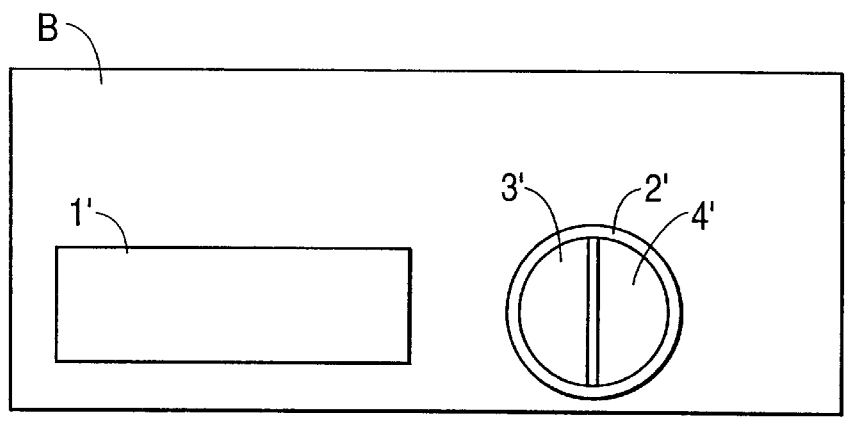
FIG. 2 shows a second embodiment of the instrument panel according to the invention.

FIG. 2 shows a second embodiment B of the instrument panel according to the invention, which, as the embodiment according to FIG. 1, comprises an alphanumerical indicator 1', a knob 2' and two keys 3' and 4'.

The indicator 1' can be identical to the indicator 1 according to FIG. 1.

In the embodiment in FIG. 2, the knob 2' is annular, while the keys 3' and 4' are semicircular and arranged stationary inside the periphery of the knob 2' for switching/operating one switch (not shown) each.

Figure 3:
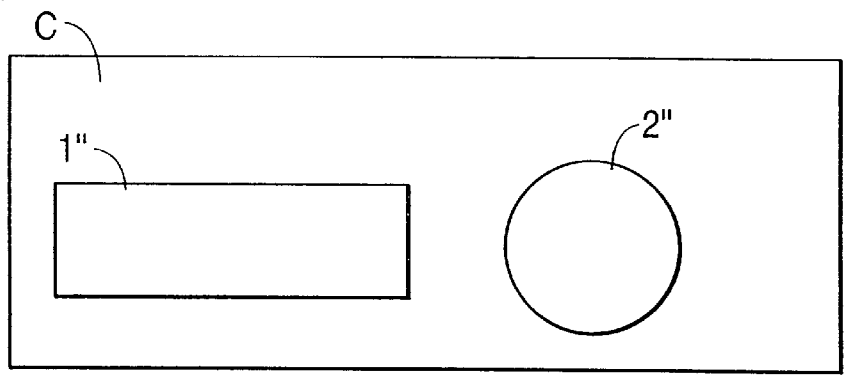
FIG. 3 shows a third embodiment of the instrument panel according to the invention.

FIG. 3 shows a third embodiment C of the instrument panel according to the invention, which, as the embodiments according to FIGS. 1 and 2 comprises an alphanumerical indicator 1", which can be identical to the indicators 1 and 1' according to FIG. 1 and FIG. 2, respectively, and a knob 2". As apparent, the instrument panel C according to FIG. 3 lacks keys for switching/operating corresponding switches (not shown).

However, in the embodiment according to FIG. 3, these switches are switchable by pulling/pushing the knob 2", i.e. the switching functions are integrated in the knob 2".

Of course, both switching functions do not have to be integrated in the knob, but embodiments with one or the other of the switching functions key-operated can exist. In such embodiments, there is, thus, a single key on the instrument panel besides the indicator and the knob.

With the instrument panel according to the invention, the different chemical, biochemical or physical instruments will be user-friendly in that all panels will function in the same manner for the user.

As soon as one has learnt to handle one instrument, one can, thus, handle all other instruments having the instrument panel according to the invention.

An instrument panel according to the invention with a single knob and either two or one or no key can, furthermore, be operated considerably faster than panels known so far.

Moreover, the ergonomy will be improved with the panel according to the invention since there is not any large number of keys to press on a vertical keyboard.

Of course, the product development of new instruments with a general, standardized panel will be much quicker since no new panel has to be developed for every new instrument.

Since neither the knob nor the two switches of the panel according to the invention are related to the function of the instrument in question, the panel can be produced in large numbers, whereupon the different instruments can be adapted to the application in question via the software.

Hereby, the instruments will be cheaper to produce.

I claim:

1. An instrument panel for co-operation with a microprocessor in which a predetermined number of selectable functions are stored together with selectable numerical information, comprising a knob (2, 2') which is rotatable through a predetermined number of discrete positions in order to, in a first operating mode of the microprocessor, select, among said selectable functions, a desired function and, in a second operating mode of the microprocessor, select the desired numerical information to be supplied to the microprocessor, and a first switch (3, 3') by means of which, in said first operating mode, the function selected by means of the knob (2, 2') is accepted and the microprocessor is transferred to said second operating mode, and by means of which, in this second operating mode, the numerical information selected by means of the knob (2, 2') is accepted and the microprocessor is returned to the first operating mode, characterized in that it comprises an alphanumerical indicator (1, 1') for displaying the functions selected by means of the knob (2, 2') as well as the alphanumerical information selected by means of the knob (2, 2'), and a second switch (4, 4') by means of which the selection made by means of the knob (2, 2') is discarded and the microprocessor is returned to the first operating mode.

2. The panel according to claim 1, characterized in that the first switch (3') and the second switch (4') are arranged stationary within the periphery of the knob (2').

3. The panel according to claim 1 or 2, characterized in that the knob (2, 2') is rotatable any number of revolutions in both directions through a predetermined number of discrete positions per revolution.

* * * * *